US009503666B2

United States Patent
Yin et al.

(10) Patent No.: US 9,503,666 B2
(45) Date of Patent: Nov. 22, 2016

(54) IMAGE SENSOR

(71) Applicant: Himax Imaging Limited, Tainan (TW)

(72) Inventors: Ping-Hung Yin, Tainan (TW); Jia-Shyang Wang, Tainan (TW); Satya Narayan Mishra, Tainan (TW); Amit Mittra, Tainan (TW); Ray-Chi Chang, Tainan (TW)

(73) Assignee: HIMAX IMAGING LIMITED, Tainan (TW)

( * ) Notice: Subject to any disclaimer, the term of this patent is extended or adjusted under 35 U.S.C. 154(b) by 0 days.

(21) Appl. No.: 14/603,107

(22) Filed: Jan. 22, 2015

(65) Prior Publication Data

US 2016/0065872 A1    Mar. 3, 2016

(30) Foreign Application Priority Data

Aug. 26, 2014   (TW) .............................. 103129406 A

(51) Int. Cl.
| | |
|---|---|
| *H04N 5/3745* | (2011.01) |
| *H04N 5/378* | (2011.01) |
| *H04N 5/374* | (2011.01) |
| *H01L 27/146* | (2006.01) |
| *H04N 5/369* | (2011.01) |

(52) U.S. Cl.
CPC ............ *H04N 5/378* (2013.01); *H04N 5/3698* (2013.01); *H04N 5/37452* (2013.01); *H04N 5/37455* (2013.01)

(58) Field of Classification Search
CPC .............. H04N 5/3698; H04N 5/37452; H04N 5/374; H04N 5/37455; H04N 5/378; H04N 5/369; H01L 27/14643
USPC ............... 348/308; 250/208.1; 257/291, 292; 341/122–126
See application file for complete search history.

(56) References Cited

U.S. PATENT DOCUMENTS

| | | | |
|---|---|---|---|
| 6,529,237 B1* | 3/2003 | Tsay ........................ | H04N 5/361 348/241 |
| 2005/0195645 A1* | 9/2005 | Panicacci ............. | H04N 5/3575 365/156 |
| 2008/0055143 A1* | 3/2008 | Han ..................... | H03M 1/1245 341/155 |
| 2011/0176045 A1* | 7/2011 | Ahn ................... | H01L 27/14603 348/308 |
| 2016/0006957 A1* | 1/2016 | Park ....................... | H04N 5/378 348/308 |

\* cited by examiner

*Primary Examiner* — Tuan Ho
*Assistant Examiner* — Marly Camargo
(74) *Attorney, Agent, or Firm* — Locke Lord LLP; Tim Tingkang Xia, Esq.

(57) ABSTRACT

An image sensor includes readout circuits coupled to read out integrated light signals from pixels via bitlines respectively. Each readout circuit includes a correlated double sampling (CDS) circuit, followed by an analog-to-digital converter (ADC). At least two pixels of a row share a bitline and an associated readout circuit. The ADC operates concurrently with the CDS circuit, such that their operating periods are substantially overlapped with each other.

11 Claims, 8 Drawing Sheets

IMAGE SENSOR

CROSS-REFERENCE TO RELATED APPLICATIONS

The entire contents of Taiwan Patent Application No. 103129406, filed on Aug. 26, 2014, from which this application claims priority, are incorporated herein by reference.

BACKGROUND OF THE INVENTION

1. Field of the Invention

The present invention generally relates to an image sensor, and more particularly to an image sensor with high speed and low power consumption.

2. Description of Related Art

An image sensor, such as a complementary metal-oxide-semiconductor (CMOS) image sensor, is a device that converts an optical image into electronic signals. The image sensor has been widely used in a variety of applications such as cell phones and cameras.

There is a trend of the image sensor towards a higher resolution, a higher speed or both. As the resolution increases, more pixels are disposed in a given area and parasitic loading becomes worse, thereby slowing down the readout speed with the same power consumption. There is another trend of the image sensor towards more compact circuit area (and thus lower power consumption), which is generally opposite to the trend of higher resolution. Accordingly, a designer of an image sensor should usually make a compromise between resolution and speed.

A need has thus arisen to propose a novel image sensor with higher speed, lower power consumption and reduced circuit area.

SUMMARY OF THE INVENTION

In view of the foregoing, it is an object of the embodiment of the present invention to provide an image sensor with high-speed low-power readout architecture.

According to one embodiment, an image sensor includes pixels and readout circuits. The pixels are arranged in rows and columns. The readout circuits are coupled to read out integrated light signals from the pixels via bitlines respectively, each readout circuit including a correlated double sampling (CDS) circuit, followed by an analog-to-digital converter (ADC). At least two pixels of a row share a bitline and an associated readout circuit. The ADC operates concurrently with the CDS circuit, such that their operating periods are substantially overlapped with each other. In one embodiment, the CDS circuit includes a first capacitor bank and a second capacitor bank, which are coupled in parallel between the bitline and the ADC.

DETAILED DESCRIPTION OF THE INVENTION

Figure 1:
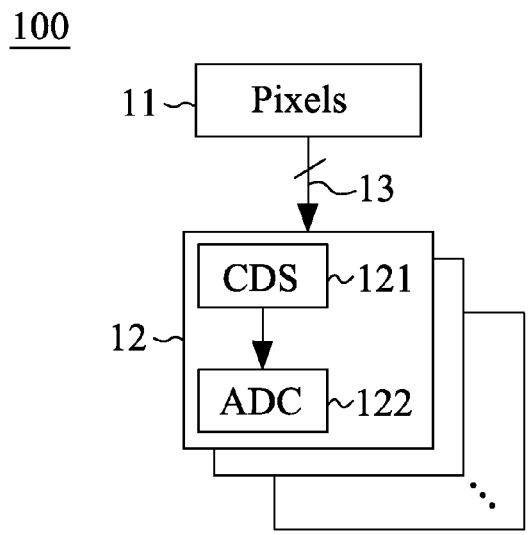
FIG. 1 shows a block diagram of an image sensor according to one embodiment of the present invention.

FIG. 1 shows a block diagram of an image sensor 100, such as a complementary metal-oxide-semiconductor (CMOS) image sensor or CIS, according to one embodiment of the present invention. The image sensor 100 may primarily include pixels 11 arranged in rows and columns. Each pixel 11 may include a photo sensor (such as a photodiode) and some transistors. The pixels 11 are controllably selected, and light signals accumulated or integrated in the pixels 11 are then read out by readout circuits 12, respectively. In the embodiment, the readout circuit 12 mainly includes a correlated double sampling (CDS) circuit 121, followed by an analog-to-digital converter (ADC) 122. The CDS circuit 121 is configured to eliminate noise due to manufacturing variation, and the ADC 122 is used to convert the integrated light signals from an analog form into a digital form, which facilitates subsequent processing performed, for example, by a digital signal processor (not shown).

According to one aspect of the embodiment, at least two pixels 11 of a (horizontal) row may share a bitline 13 and its associated readout circuit 12. As a result, a substantial power consumption and circuit (or chip) area may be saved. In one exemplary embodiment, two pixels 11 of a row may share a bitline 13 and its associated readout circuit 12, such that the integrated light signals on half of a row of pixels 11 may be outputted at a time. For example, the integrated light signals on the first-half (e.g., even-numbered) bitlines 13 may be outputted in a first period, followed by outputting the integrated light signals on the second-half (e.g., odd-numbered) bitlines 13 in a succeeding second period.

Figure 2A:
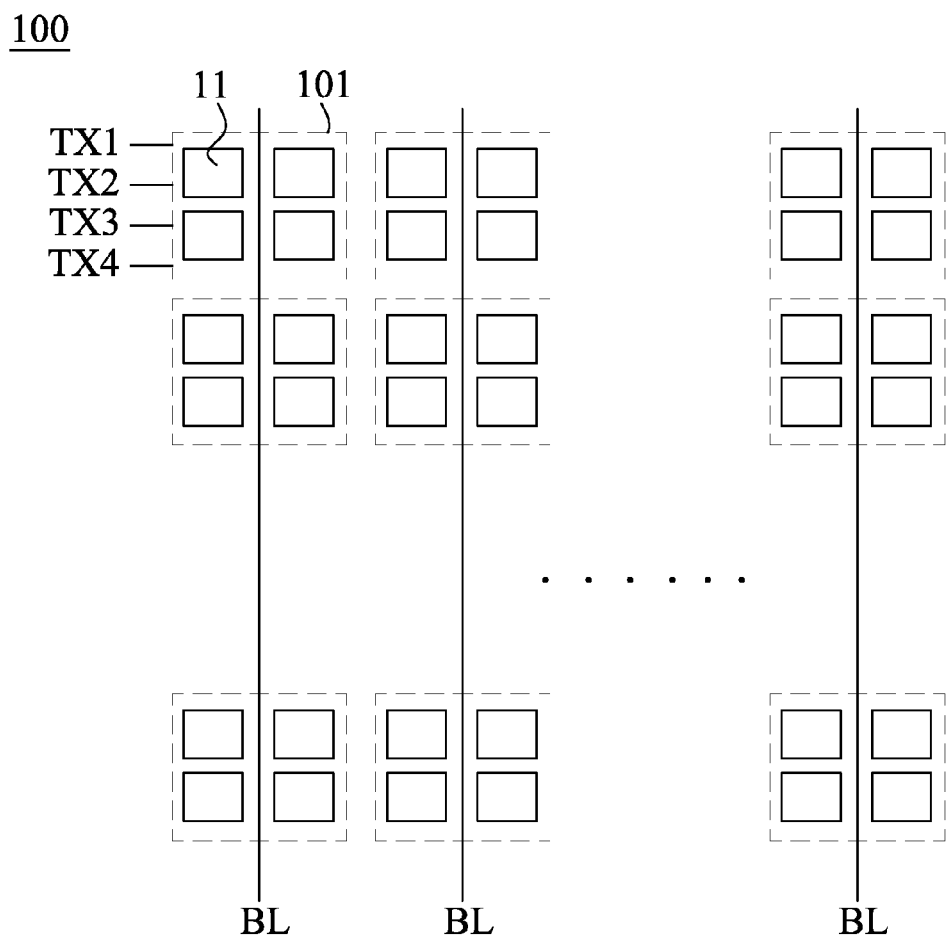
FIG. 2A shows a detailed schematic diagram illustrating the pixels in FIG. 1.
Figure 2B:
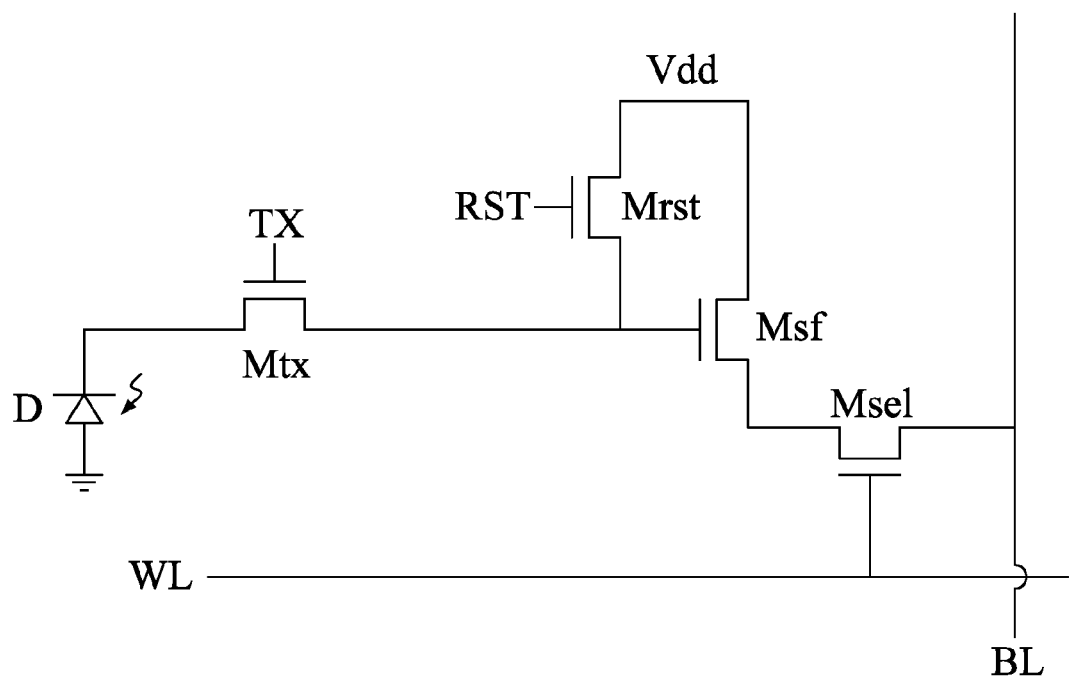
FIG. 2B shows a circuit diagram exemplifying the pixel of FIG. 2A.

FIG. 2A shows a detailed schematic diagram illustrating the pixels 11 in FIG. 1, and FIG. 2B shows a circuit diagram exemplifying the pixel 11 of FIG. 2A. Specifically, the pixel 11 includes a photodiode D and three transistors—a reset transistor Mrst, a source follower transistor Msf, a selector transistor Msel and a transfer transistor Mtx. When the reset transistor Mrst is turned on by a reset signal RST, the photodiode D is reset to a reference voltage such as a power supply Vdd. When the transfer transistor Mtx is turned on by a transfer signal TX, an integrated light signal of the photodiode D may then be transferred. The source follower transistor Msf may be activated to buffer or amplify the integrated light signal of the photodiode D. When the selector transistor Msel is turned on by a word line signal WL, a pixel signal may then be readout via the selector transistor Msel.

According to another aspect of the embodiment, referring back to FIG. 2A, every four neighboring pixels 11 arranged in 2×2 matrix to form a pixel group 101 may share one bitline BL for outputting their integrated light signals. The integrated light signals on half a (horizontal) row of pixels 11 may be outputted at a time. For example, the integrated light signals on the even-numbered bitlines BLs may be outputted in a first period, followed by outputting the integrated light signals on the odd-numbered bitlines BLs in a succeeding second period. The integrated light signals of the four composing pixels 11 in each pixel group 101 may be controllably outputted according to their transfer signals TX1, TX2, TX3 and TX4, respectively.

Figure 2C:
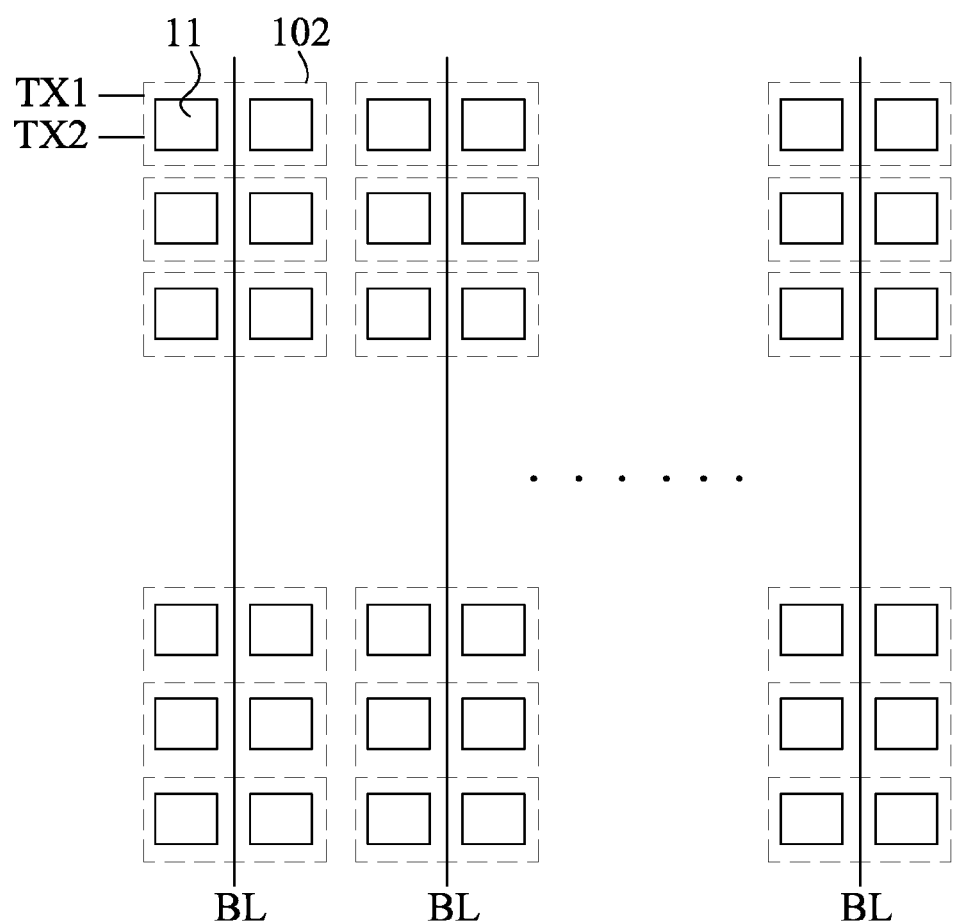
FIG. 2C shows an alternative schematic diagram illustrating the pixels in FIG. 1.

FIG. 2C shows an alternative schematic diagram illustrating the pixels 11 in FIG. 1. In this example, every two neighboring pixels 11 arranged in 1×2 matrix to form a pixel group 102 may share one bitline BL for outputting their integrated light signals. The integrated light signals of the two composing pixels 11 in each pixel group 102 may be controllably outputted according to their transfer signals TX1 and TX2, respectively.

Figure 3:
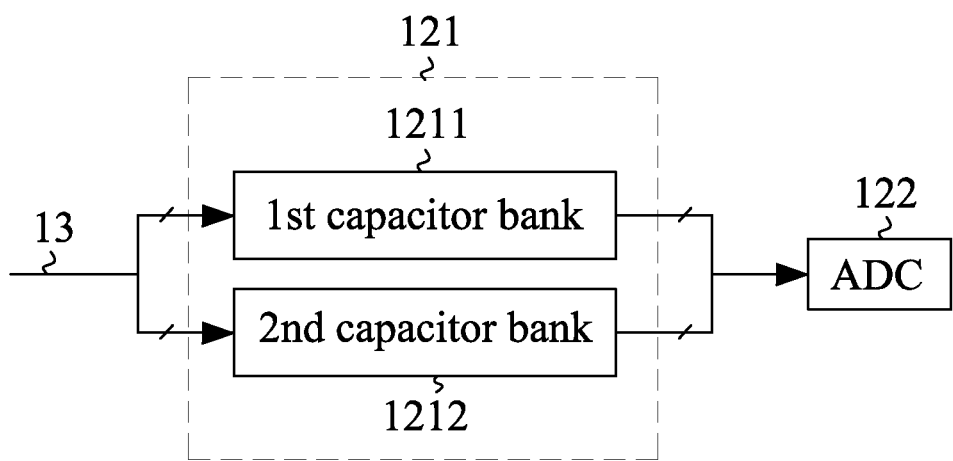
FIG. 3 shows a detailed block diagram of a CDS circuit associated with a bitline according to one embodiment of the present invention.

FIG. 3 shows a detailed block diagram of a CDS circuit 121 associated with a bitline 13 according to one embodiment of the present invention. The CDS circuit 121 of the embodiment includes two capacitor banks, i.e., a first capacitor bank 1211 and a second capacitor bank 1212, which are coupled in parallel between a bitline 13 and the ADC 122. Specifically, the two capacitor banks 1211 and 1212 are activated in turn.

Figure 4A:
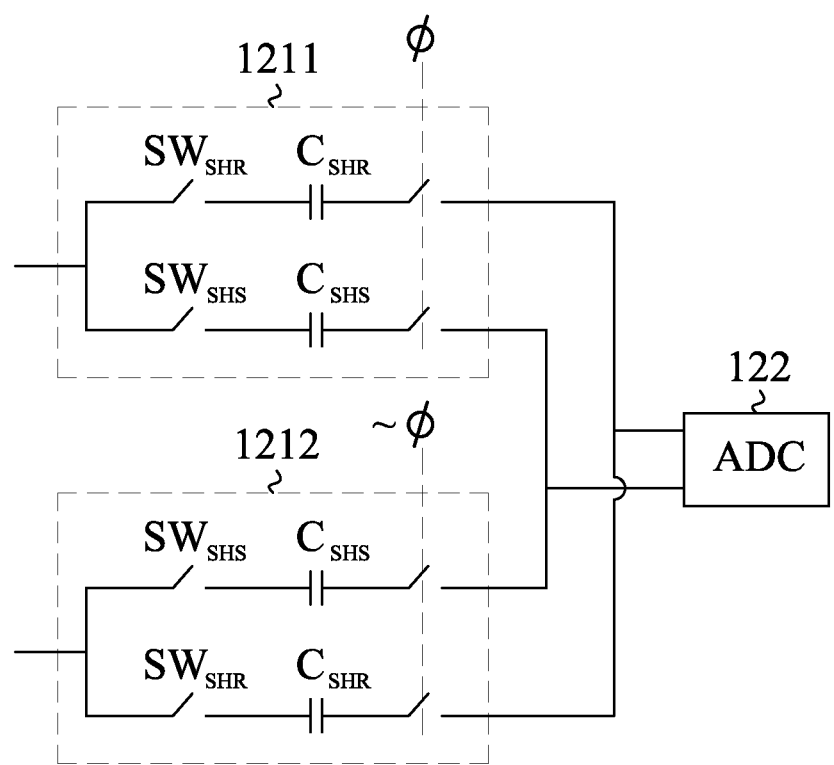
FIG. 4A shows a detailed circuit diagram exemplifying the two capacitor banks in FIG. 3.

FIG. 4A shows a detailed circuit diagram exemplifying the two capacitor banks 1211 and 1212 in FIG. 3. Specifically speaking, SWSHR represents a sample-and-hold-reset_signal (SHR) switch, SWSHS represents a sample-and-hold-image_signal (SHS) switch, CSHR represents a SHR capacitor, and CSHS represents a SHS capacitor. The first capacitor bank 1211 and the second capacitor bank 1212 are controlled by an enable signal ψ and an inverted enable ~ψ, respectively.

Figure 4B:
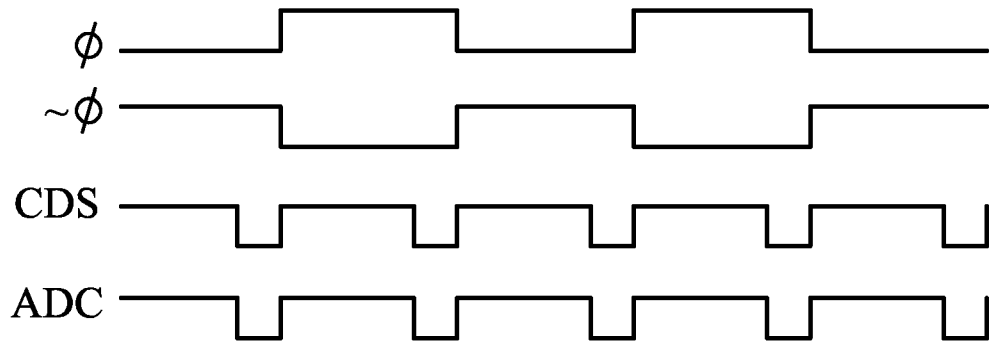
FIG. 4B shows an exemplary timing diagram of the CDS circuit and the ADC in FIG. 4A.

FIG. 4B shows an exemplary timing diagram of the CDS circuit 121 and the ADC 122 in FIG. 4A. Specifically, the first capacitor bank 1211 is activated in a first-half period under control of the enable signal ψ, and the second capacitor bank 1212 is activated in a second-half period under control of the inverted enable signal ~ψ. According to a further aspect of the embodiment, the ADC 122 operates in both the first-half period and the second-half period. For example, in a second-half period, the ADC 122 operates on signals that are generated from the first capacitor bank 1211 in a (preceding) first-half period. Likewise, in a first-half period, the ADC 122 operates on signals that are generated from the second capacitor bank 1211 in a (preceding) second-half period. In other words, the ADC 122 of the embodiment may operate concurrently with the CDS circuit 121, such that their operating periods may be substantially overlapped with each other.

Figure 4C:
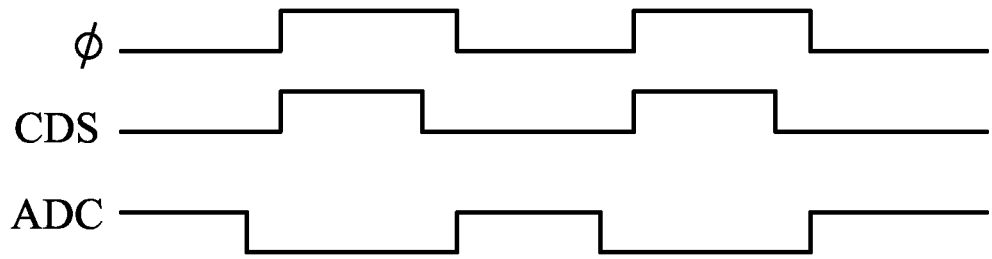
FIG. 4C shows an exemplary timing diagram of a conventional image sensor, with sharing bitlines, that uses only one capacitor bank in a CDS circuit.

Compared with a conventional image sensor, with sharing bitlines, that uses only one capacitor bank in a CDS circuit, as demonstrated in a timing diagram of FIG. 4C, an ADC could only wait until signals generated from the CDS circuit are ready. In other words, the ADC and the CDS circuit operate alternately. Accordingly, the image sensor 100 according to the embodiment as demonstrated in FIG. 4B may perform faster in a more efficient manner than the conventional counterpart as shown in FIG. 4C.

Figure 5A:
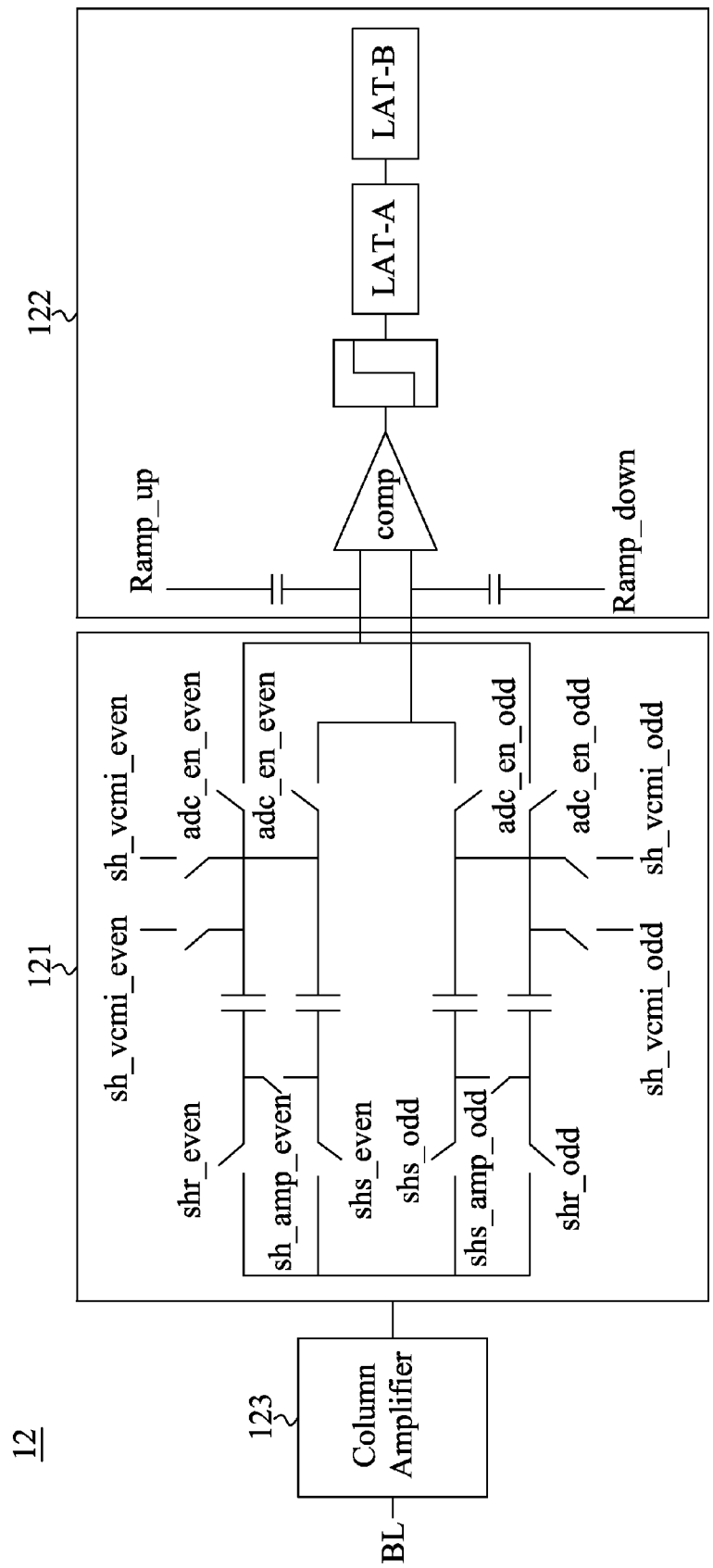
FIG. 5A shows a circuit diagram of the readout circuit according to a specific embodiment of the present invention.
Figure 5B:
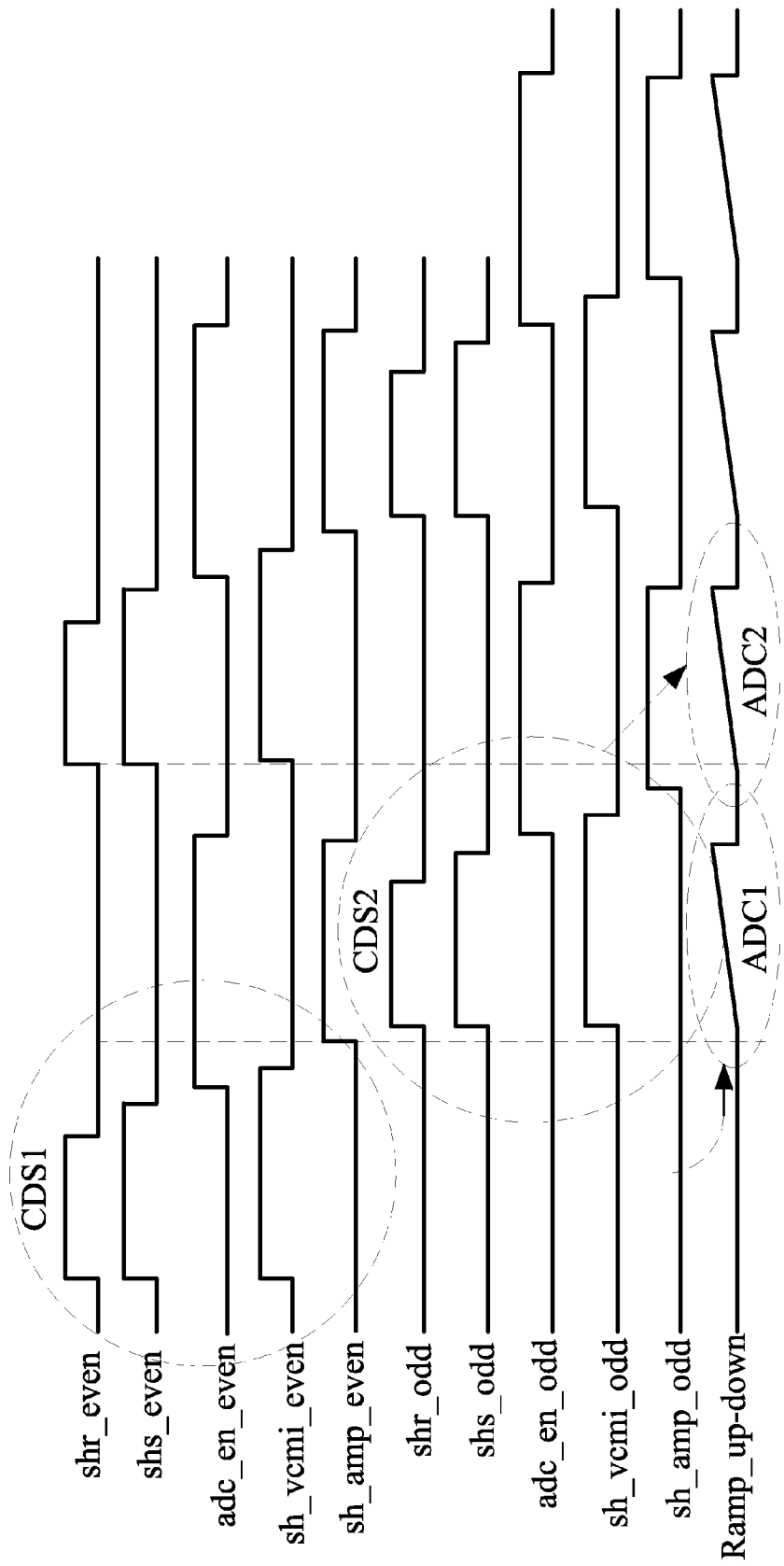
FIG. 5B shows an exemplary timing diagram of the readout circuit of FIG. 5A.

FIG. 5A shows a circuit diagram of the readout circuit 12 according to a specific embodiment of the present invention. Specifically, the readout circuit 12 includes a CDS circuit 121 with two capacitor banks and an ADC 122. It is noted that a column amplifier (CA) 123 may be optionally disposed between a bitline (BL) and the CDS circuit 121. FIG. 5B shows an exemplary timing diagram of the readout circuit 12 of FIG. 5A. Specifically speaking, the first capacitor bank 1211 and the second capacitor bank 1212 are activated in turn. For example, as shown in FIG. 5B, the first capacitor bank 1211 is activated in a first-half period designated by CDS1, and the second capacitor bank 1212 is activated in a second-half period designated by CDS2. Signals generated in CDS1 by the first capacitor bank 1211 are fed to (as indicated by a dotted arrow line) and processed by the ADC 122 in the second-half period designated by ADC1. Similarly, signals generated in CDS2 by the second capacitor bank 1212 are fed to (as indicated by another dotted arrow line) and processed by the ADC 122 in the succeeding first-half period designated by ADC2. As a result, the ADC 122 may operate concurrently with either the first capacitor bank 1211 or the second capacitor bank 1212 of the CDS circuit 121, such that their operating periods may be substantially overlapped with each other, thereby greatly increasing speed and reducing power consumption.

Although specific embodiments have been illustrated and described, it will be appreciated by those skilled in the art that various modifications may be made without departing from the scope of the present invention, which is intended to be limited solely by the appended claims.

What is claimed is:

1. An image sensor, comprising:
a plurality of pixels arranged in rows and columns; and
a plurality of readout circuits coupled to read out integrated light signals from the plurality of pixels via bitlines respectively, each of the plurality of readout circuits including a correlated double sampling (CDS) circuit, followed by an analog-to-digital converter (ADC), at least two pixels of the plurality of pixels of a row sharing a bitline and an associated readout circuit;
wherein the ADC operates concurrently with the CDS circuit, such that their operating periods are substantially overlapped with each other; and
wherein the CDS circuit comprises a first capacitor bank and a second capacitor bank, which are coupled in parallel between the bitline and the ADC, the first capacitor bank is activated in a first-half period under control of an enable signal, and the second capacitor bank is activated in a second-half period under control of an inverted enable signal.

2. The image sensor of claim 1, wherein the integrated light signals on half of a row of the pixels are outputted at a time.

3. The image sensor of claim 1, wherein every four neighboring pixels of the plurality of pixels are arranged in 2×2 matrix to form a pixel group that shares one bitline for outputting the integrated light signals.

4. The image sensor of claim 1, wherein the first capacitor bank and the second capacitor bank are activated in turn.

5. The image sensor of claim 1, wherein the ADC operates on signals that are generated in a preceding period from the first capacitor bank or the second capacitor bank.

6. An image sensor, comprising:
a plurality of pixels arranged in rows and columns; and
a plurality of readout circuits coupled to read out integrated light signals from the plurality of pixels via bitlines respectively, each of the plurality of readout circuits including a correlated double sampling (CDS) circuit, followed by an analog-to-digital converter (ADC), at least two pixels of the plurality of pixels of a row sharing a bitline and an associated readout circuit;

wherein the CDS circuit comprises a first capacitor bank and a second capacitor bank, which are coupled in parallel between the bitline and the ADC; and wherein the first capacitor bank is activated in a first-half period under control of an enable signal, and the second capacitor bank is activated in a second-half period under control of an inverted enable signal.

7. The image sensor of claim 6, wherein the first capacitor bank and the second capacitor bank are activated in turn.

8. The image sensor of claim 6, wherein the ADC operates concurrently with the CDS circuit, such that their operating periods are substantially overlapped with each other.

9. The image sensor of claim 6, wherein the integrated light signals on half of a row of the pixels are outputted at a time.

10. The image sensor of claim 6, wherein every four neighboring pixels of the plurality of pixels are arranged in 2×2 matrix to form a pixel group that shares one bitline for outputting the integrated light signals.

11. An image sensor, comprising:

a plurality of pixels arranged in rows and columns; and a plurality of readout circuits coupled to read out integrated light signals from the plurality of pixels via bitlines respectively, each of the plurality of readout circuits including a correlated double sampling (CDS) circuit, followed by an analog-to-digital converter (ADC), at least two pixels of the plurality of pixels of a row sharing a bitline and an associated readout circuit;

wherein the CDS circuit comprises a first capacitor bank and a second capacitor bank, which are coupled in parallel between the bitline and the ADC; and wherein the ADC operates on signals that are generated in a preceding period from the first capacitor bank or the second capacitor bank.

* * * * *